June 30, 1959  A. D. GOODWIN  2,892,505
VEHICLE WITH STEERING BY DRIVING MECHANISM
Filed March 21, 1958  3 Sheets-Sheet 2

INVENTOR.
Alfred D. Goodwin
BY
Webster & Webster
ATTYS.

June 30, 1959   A. D. GOODWIN   2,892,505
VEHICLE WITH STEERING BY DRIVING MECHANISM
Filed March 21, 1958   3 Sheets-Sheet 3
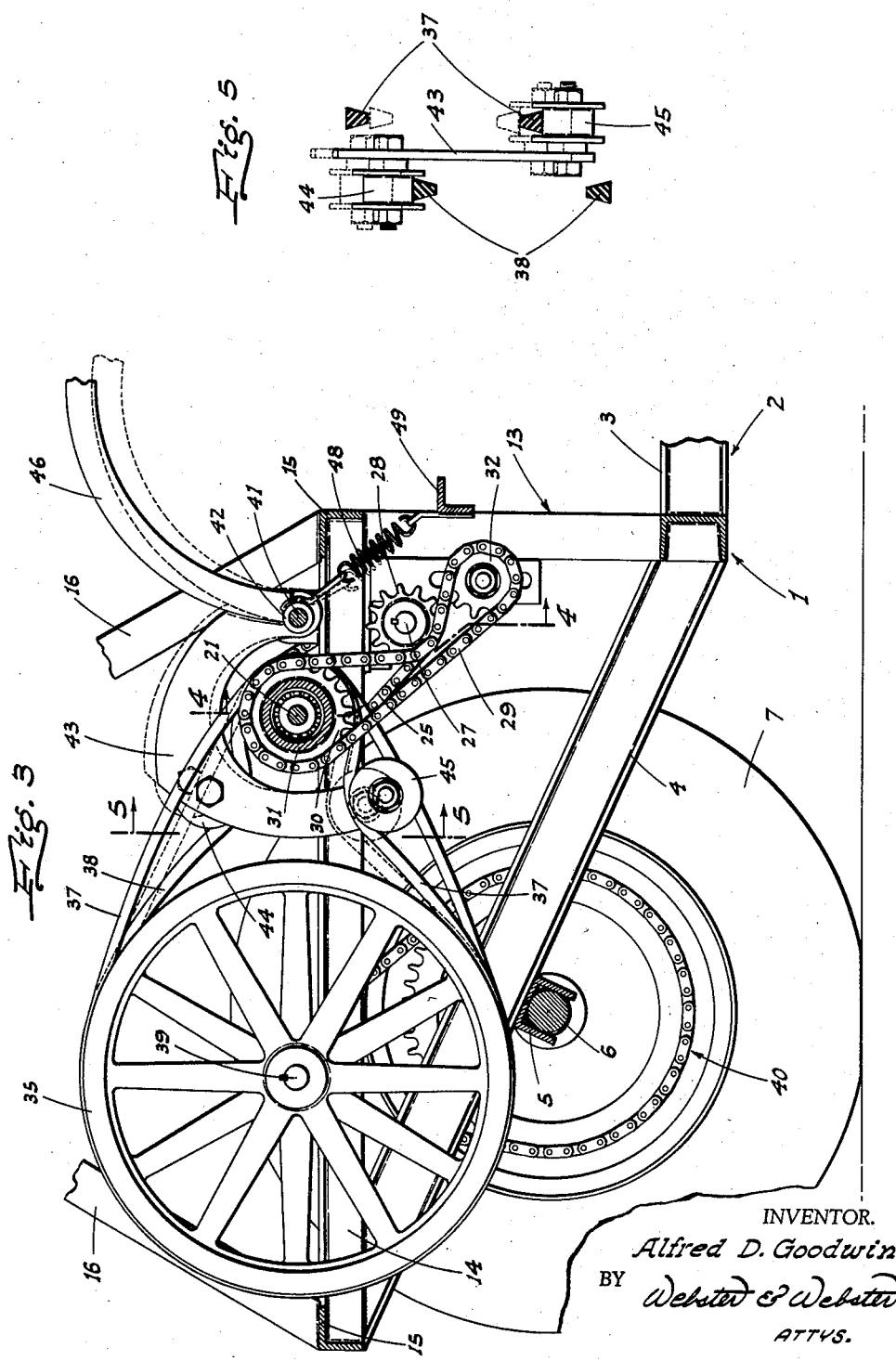
INVENTOR.
Alfred D. Goodwin
BY Webster & Webster
ATTYS.

United States Patent Office 2,892,505
Patented June 30, 1959

2,892,505

VEHICLE WITH STEERING BY DRIVING MECHANISM

Alfred D. Goodwin, Manteca, Calif., assignor to A. D. Goodwin & Son, Inc., a corporation of California Application March 21, 1958, Serial No. 722,977

2 Claims. (Cl. 180—6.66)

This invention relates to a self-propelled vehicle or tractor of the tricycle or three-wheel type, and particularly to one which has been especially designed for orchard use, to serve as a mobile mount for an implement such as the tree shaker and knocker shown in my pending application, Serial No. 708,084, filed January 10, 1958.

The major object of the present invention is to provide a vehicle or tractor of this general type which is extremely maneuverable, and can be quickly and easily caused to run forwards or backwards, as well as being steered to the right or left, or turned in a complete circle within its own length. The vehicle is thus admirably adapted for use in an orchard, since it can be manipulated so as to be disposed at any desired position relative to a tree without interfering with other trees.

Another and highly important object of the invention is to provide an extremely simple and inexpensive means for controlling the movements of the vehicle, without the use of mechanical clutches, gear mechanisms, or the like.

A further object of the invention is to construct the vehicle so that it has a very low bed and platform onto which the operator may directly step from the ground, so that such operator, whether standing or seated, will always be below low-hanging limbs, and thus out of harm's way.

Still another object of the invention is to provide a practical, reliable, and durable self-propelled vehicle, and one which will be exceedingly effective for the purpose for which it is designed.

These objects are accomplished by means of such structure and relative arrangement of parts as will fully appear by a perusal of the following specification and claims.

In the drawings:

Fig. 3 is an enlarged fragmentary longitudinal section taken on line 3—3 of Fig. 2.

Fig. 4 is a fragmentary transverse section of the driving mechanism of the vehicle, taken on line 4—4 of Fig. 3.

Fig. 5 is a similar fragmentary view taken on line 5—5 of Fig. 3.

Figure 1:
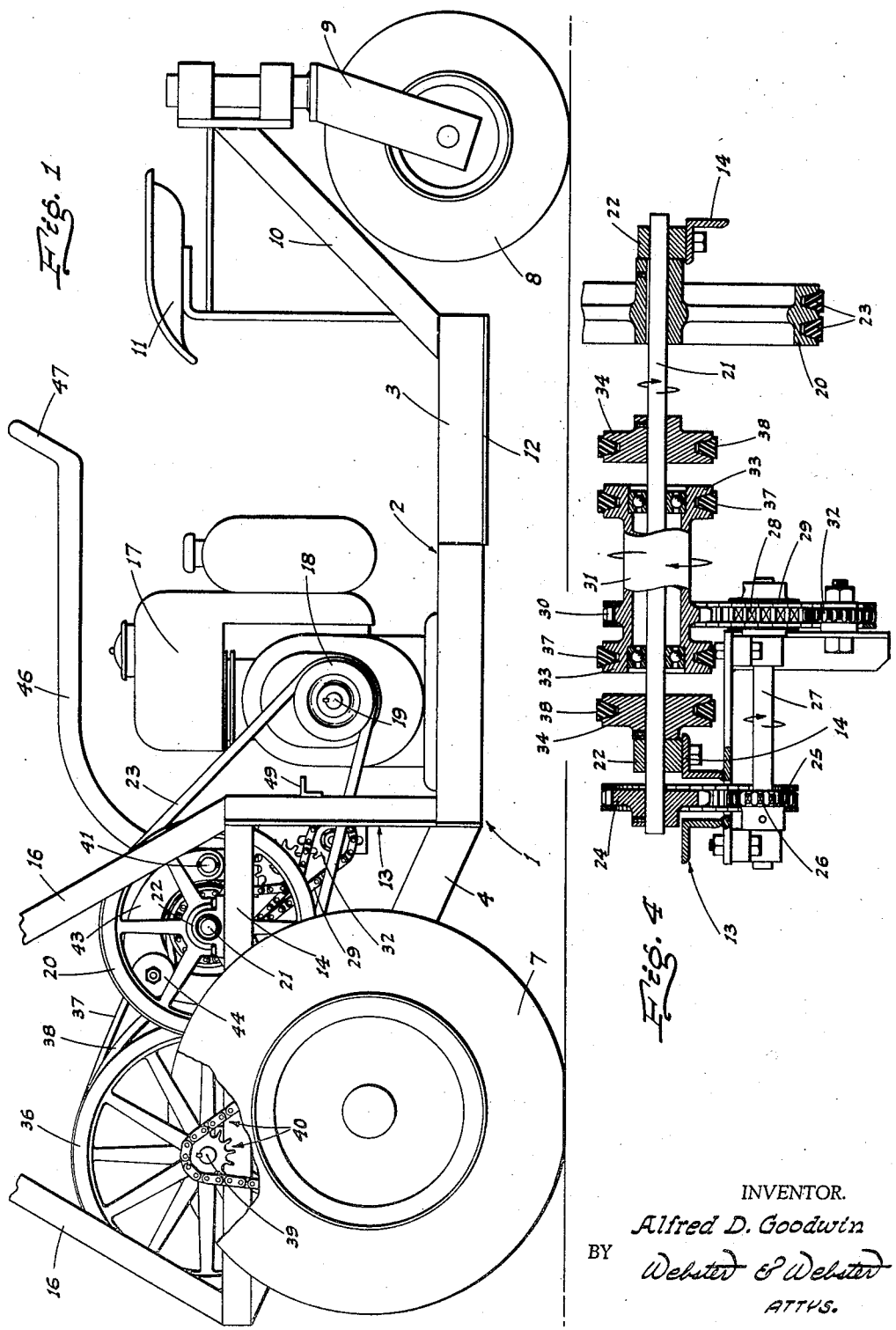
Fig. 1 is a side elevation of the improved vehicle, partly broken away, and shown as if moving backwards or in reverse.
Figure 2:
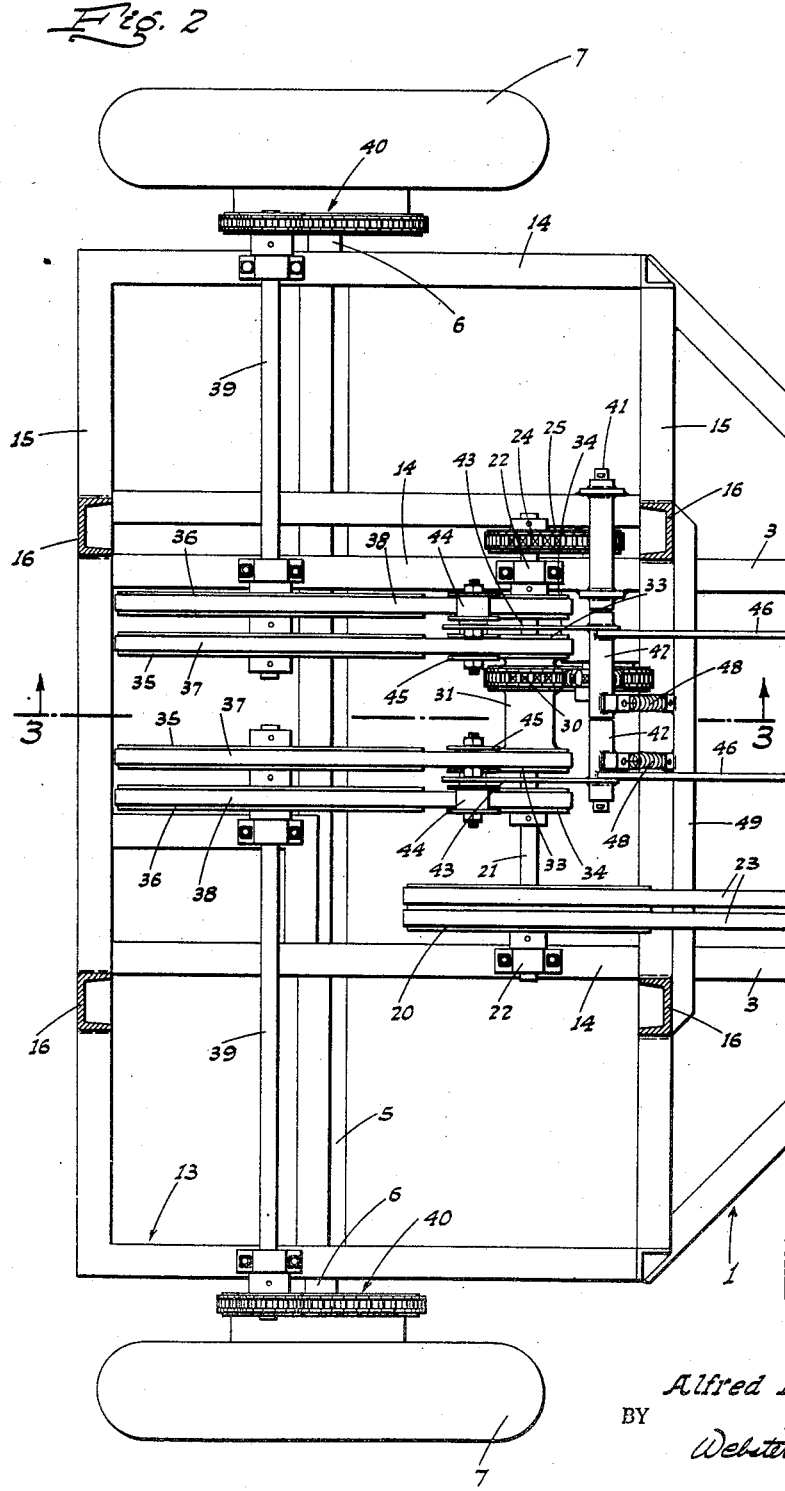
Fig. 2 is a fragmentary top plan view of the vehicle; the upstanding frame beams being cut away and in section.

Referring now more particularly to the drawings, and to the characters of reference marked thereon, the vehicle comprises a main drop-center frame, indicated generally at 1, and which includes transversely spaced longitudinal beams 2, the rear portions 3 of which are horizontal and close to the ground, while the forward portions of said beams slope upwardly to the forward end of the frame. Intermediate their ends, the beam portions 4 are stiffened by a downwardly opening transverse channel beam 5, which supports a transverse axle 6 on the outer ends of which drive wheels 7 are independently and turnably mounted.

The beams 2 at their rear ends are supported by a centrally disposed caster wheel 8, the mounting frame 9 of which is swivelly mounted in a rearwardly sloping bracket 10 rigid with and upstanding from the beams 2, and arranged so that the caster wheel frame can freely swing about a vertical axis without interference of the caster wheel with said bracket, as shown in Fig. 1.

The bracket 10 also supports a forwardly facing seat 11 for the driver or operator of the vehicle, and the feet of which driver then rest on a platform 12 extending between the adjacent portion of beams 2.

An auxiliary frame structure 13 which includes a number of longitudinal horizontal beams 14 and transverse end beams 15 is built onto the main frame 1 ahead of the drop center portion thereof. The beams 15 in the present vehicle support uprights 16 of a tree shaker and knocker, such as that shown in my previously identified application for patent, and for which the vehicle of the present application has been particularly designed, as stated.

In order to drive and maneuver the above described chassis structure, the following mechanism is provided:

Mounted on the drop-center portion of the frame 1 ahead of the platform 12 is an internal combustion engine 17 having a dual V-pulley 18 on one end of its drive shaft 19, and which pulley is alined with a similar but larger pulley 20 fixed on a jack shaft 21 journaled in bearings 22 fixed on certain ones of the beams 14 relatively near their forward ends. Pulleys 18 and 20 are connected in constant driving relation by V-belts 23.

Fixed on shaft 21 at the end opposite pulley 20 is a sprocket 24 which by means of a chain 25 drives a sprocket 26 fixed on a countershaft 27 suitably journaled on frame 13 below and parallel to shaft 21; shafts 21 and 27 being driven in the same direction.

Also fixed on shaft 27 is another sprocket 28 (see Fig. 3) which engages an endless chain 29 on the outer face thereof. This chain extends about a sprocket 30 fixed on a spool or elongated hub 31 turnable on shaft 21, and also about an idler sprocket 32; sprocket 28 engaging the outer side of chain 29 so that the spool 31 is rotated in a reverse direction from shaft 27 (see Fig. 4).

V-pulleys 33 are formed with or fixed on spool 31 at the ends thereof, and are adjacent other V-pulleys 34 which are fixed on the shaft 21. Adjacent pulleys 33 and 34 together form a pulley unit.

The pulleys 33 and 34 of each such pulley unit are alined with a corresponding pulley unit which comprises larger pulleys 35 and 36, respectively. The pulleys of the two units are connected in driving relation by V-belts 37 and 38, respectively. The pairs of pulleys 35 and 36 are fixed on shafts 39 journaled on the auxiliary frame 13 toward its forward end; each such shaft at its outer end being connected in driving relation to the adjacent wheel 7 by a chain and sprocket drive 40 of conventional form.

The belts 37 and 38 are normally slack so that no drive is imparted to the shafts 39 or wheels 7. In order to selectively tighten each such belt so as to then drive the corresponding shaft 39 and wheel in one direction or the other, the following control arrangement is provided:

Fixed on the frame 13 adjacent and rearwardly of spool 31 is a shaft 41 on which a pair of hubs 42, each extending across the space between a pair of adjacent sprockets 33 and 34, are turnable. An arm 43 is fixed on each hub, and extends forwardly over the spool 31 and then downwardly between the corresponding belts 37 and 38, as shown particularly in Figs. 3 and 5.

Mounted on the arm 43 on one side thereof in position to overhang and engage the upper run of belt 38 is an idler or presser pulley 44. On the opposite side of the arm 43 an idler or lift pulley 45 is mounted; this pulley being positioned to underlie and engage the lower run of the belt 37, as shown in Fig. 5. The direction of drive of shaft 21 is such that belts 38 and the related pulleys control the forward movement of the wheels, while belts 37 and the related pulleys control the reverse movement of the wheels.

An actuating lever 46 is rigid with and projects rearwardly from each hub 42; the lever extending in a generally horizontal direction over the engine 17 to a termination in an outwardly projecting handle 47, as shown in Fig. 1, and which is positioned convenient for engagement by the hand of the operator on the seat 11.

A tension spring 48 extends between the cross bar 49 on frame 13 and each hub 31 and is connected to such hub at a point thereon which will cause the same to be rotated so as to maintain the arm 43—if otherwise unrestrained—in a floating position so that the idlers 44 and 45 leave the belts 37 and 38 in their normal slack condition.

By reason of the above arrangement, it will be seen that upon a forward or upward movement of both levers 46 simultaneously, both wheels 7 will be driven in a forward direction, and the vehicle will travel straight ahead.

If one only of the levers is thus moved, one wheel only of the vehicle will be driven, and said vehicle will turn or be steered to one side or the other. If a sharper steering action is desired, one lever 46 may be swung down while the other lever is swung up, so that one wheel 7 is driven forwardly while the other wheel is driven in a reverse direction.

Similarly, the vehicle may be driven in a straight rearward or reverse direction, or steered to one side or the other while being thus reversely driven, by suitable manipulation of the levers. The caster wheel 8 of course trails or swivels as the movement of the wheels 7 dictates.

Efficient, simple, and trouble-free actuation and control of the vehicle is thus obtained without the use of any clutches, gearing, or other mechanisms which are relatively complex.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a self-propelled vehicle having a pair of transversely spaced wheels mounted for independent rotation, a pair of transverse shafts separately connected to the wheels in driving relation, and means to reversibly and selectively drive the shafts comprising a jackshaft parallel to and spaced from the transverse shafts and constantly driven in one direction, a spool turnable on the jackshaft intermediate its ends, means driving the spool in a direction opposite that of the jackshaft, a pair of pulley units disposed in spaced relation lengthwise of the jackshaft, each unit comprising a pulley fixed on the spool at one end thereof, and a pulley fixed on the jackshaft adjacent said one end of the spool, a pair of corresponding pulley units fixed on said separate shafts, normally slack belts connecting the pulleys of the two units, and manual control means for the belts of each unit to selectively tension the belts.

2. A reversing drive mechanism comprising a shaft, a pair of pulleys fixed on the shaft in relatively close relation, another pair of pulleys mounted in spaced alined relation to the first named pulleys, normally slack belts disposed about and connecting the alined pulleys of the pairs, means driving said other pulleys in opposite directions relative to each other, a lever pivoted parallel to the axis of said other pulleys in spaced relation thereto, an arm projecting between the belts and operatively connected to the lever for oscillating movement therewith, an element on the arm on one side thereof and overlying one run of one belt for engagement therewith, another element on the arm on the other side thereof and overlying one run of the other belt for engagement therewith, said elements engaging the belts in tightening relation only upon turning of the lever in one direction or the other from a predetermined position, and a spring acting on the lever to yieldably hold the same in said position.

References Cited in the file of this patent

UNITED STATES PATENTS

| | | |
|---|---|---|
| 1,360,078 | Berry | Nov. 23, 1920 |
| 1,371,330 | Springer | Mar. 15, 1921 |
| 1,696,967 | Opferkuck | Jan. 1, 1929 |
| 2,461,391 | Osterhaus | Feb. 8, 1949 |
| 2,520,835 | England | Aug. 29, 1950 |
| 2,756,615 | Kantz | July 31, 1956 |